United States Patent
Prasky et al.

(10) Patent No.: US 7,124,287 B2
(45) Date of Patent: Oct. 17, 2006

(54) DYNAMICALLY ADAPTIVE ASSOCIATIVITY OF A BRANCH TARGET BUFFER (BTB)

(75) Inventors: Brian R. Prasky, Wappingers Falls, NY (US); Moinuddin K. A. Qureshi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 10/436,397

(22) Filed: May 12, 2003

(65) Prior Publication Data

US 2004/0230780 A1  Nov. 18, 2004

(51) Int. Cl.
*G06F 9/42* (2006.01)

(52) U.S. Cl. .................................................... 712/238

(58) Field of Classification Search .............. 712/238, 712/235
See application file for complete search history.

(56) References Cited

U.S. PATENT DOCUMENTS 6,119,222 A * 9/2000 Shiell et al. ............... 712/238

* cited by examiner

*Primary Examiner*—Eddie Chan
*Assistant Examiner*—Ryan Fiegle
(74) *Attorney, Agent, or Firm*—Lynn L. Augspurger; Richard M. Goldman (57) ABSTRACT

Disclosed is a method and apparatus providing the capability to create a dynamic associative branch target buffer (BTB). A dynamically based associative BTB allows for either an increase number of entries and/or a reduction in area over current based static based BTBs while up to retaining the same confidence level of prediction accuracy.

53 Claims, 7 Drawing Sheets

DYNAMICALLY ADAPTIVE ASSOCIATIVITY OF A BRANCH TARGET BUFFER (BTB)

FIELD OF THE INVENTION

This invention relates to computer processing systems, and particularly to branch detection and branch target prediction in a computer processing system with pipelined processors.

BACKGROUND OF THE INVENTION

The art of pipeline processor performance improvements is vast; however, performance improvements usually come at the cost of chip area and power. One methodology for improving processor performance is the modification of a branch target buffer (BTB) used in branch target prediction where performance improvements can be made while reducing area.

A basic pipeline microarchitecture of a microprocessor processes one instruction at a time. The basic dataflow for an instruction follows the steps of: instruction fetch, decode, register read, execute, and write back. Each stage within a pipeline occurs in order and hence a given stage can not progress unless the stage in front of it is progressing. In order to achieve highest performance for the given base, one instruction must enter the pipeline every cycle. Whenever the pipeline has to be delayed or cleared, this adds latency which in turn can be monitored by the performance with which a microprocessor carries out a task. While there are many complexities that can be added on to a pipeline design, this sets the groundwork for branch prediction theory.

There are many dependencies between instructions which prevent the optimal case of a new instruction entering the pipeline every cycle. These dependencies add latency to the pipeline. One category of latency contribution deals with branches. In a pipeline processor, an instruction must be decoded at every clock cycle in order to sustain the pipeline, yet the branch decision doesn't occur until the Execution stage (i.e., after the Instruction Fetch, and Instruction Decode/Register Fetch Stages). This delay in determining the proper branch to take is called a "Branch Hazard" One solution to the Branch Hazard is to make assumptions or predictions about the branch being taken or not taken. For example, when a branch is decoded, it can either be taken or not taken. In this context a branch is an instruction which can either fall through to the next sequential instruction, i.e., "not taken," or branch off to another instruction address, "taken", and carry out execution of a different series of code. At decode time, the branch is detected, and must wait to be resolved in order to know the proper direction the instruction stream is to proceed. By waiting for potentially multiple pipeline stages for the branch to resolve the direction to proceed, latency is added into the pipeline; this is the "Branch Hazard.".

To overcome the latency of waiting for the branch to resolve, the direction of the branch can be predicted such that the pipeline begins decoding either down the taken or not taken path. At branch resolution time, the guessed direction is compared to the actual direction the branch is to take. If the actual branch direction and the guessed branch direction are the same, then the latency of waiting for the branch to resolve has been removed from the pipeline in this scenario. If, however, the actual branch direction and the predicted branch direction miscompare, then decoding proceeded down the improper path and all instructions in this path behind that of the improperly guessed direction of the branch must be flushed out of the pipeline, and the pipeline must be restarted at the correct instruction address to begin decoding the actual path of the given branch. Because of controls involved with flushing the pipeline and beginning over, there is a penalty associated with the improper guess and latency is added into the pipeline over simply waiting for the branch to resolve before decoding further. By having a proportionally higher rate of correctly guessed paths, the ability to remove latency from the pipeline by guessing the correct direction out weighs the latency added to the pipeline for guessing the direction incorrectly.

One method of reducing Branch Hazard latency is the implementation of a Branch History Table (BHT) to improve the accuracy of the branch guesses. Specifically, to improve the accuracy of the guesses associated with the guess of a branch, the branch history table (BHT) can be implemented. The Branch History Table facilitates direction guessing of a branch based on the past behavior of the branch. If the branch is always taken, as is the case of a subroutine return, then the branch will always be guessed as taken. IF/THEN/ELSE structures become more complex in their behavior. A branch may be always taken, sometimes taken and not taken, or always not taken. Based on the implementation of a dynamic branch predictor, this will determine how well the BHT predicts the direction of the branch.

When a branch is guessed as taken, the target of the branch is decoded. The target of the branch is acquired by making a fetch request to the instruction cache for the address which is the target of the given branch. Making the fetch request out to the cache involves minimal latency if the target address is found in the first level of cache. If there is not a hit in the first level of cache, then the fetch continues through the memory and storage hierarchy of the machine until the instruction text for the target of the branch is acquired. Therefore, any given taken branch detected at decode has a minimal latency associated with it that is added to the amount of time it takes the pipeline to process the given instruction. Upon missing a fetch request in the first level of memory hierarchy, the latency penalty the pipeline pays grows higher and higher the further up the hierarchy the fetch request must progress until a hit occurs. In order to hide part or all of the latency associated with the fetching of a branch target, a branch target buffer (BTB) works in parallel with a BHT.

Given a current address which is currently being decoded from, the BTB can search for the next instruction address which contains a branch from this point forward. Along with storing the instruction address of branches in the BTB, the target of the branch is also stored with each entry. With the target being stored, the address of the target can be fetched before the branch is ever decoded. By fetching the target address ahead of decode, latencies associated with cache misses can be minimized to the point of time it takes between the fetch request and the decode of the branch.

However, even with the Branch History Table and Static Branch Target Buffer, there is substantial latency, and, thus, a clear need exists for an apparatus and method to improve the fraction of correctly guessed paths and to thereby reduce the latency of the pipeline.

SUMMARY OF THE INVENTION

The shortcomings of the prior art are overcome and additional advantages are provided through the provision of a dynamic, associative branch target buffer (BTB) having a compression mechanism within a branch target buffer (BTB). By the expedient of dynamically altering the size of a given entry an optimal number entries can be stored in the table. In particular, our invention provides an apparatus and method which dynamically varies the associativity of a BTB per line; thereby allowing the BTB to hold substantially more entries than the same number of bits used in current design methodology. This is accomplished by keeping state bits that represent correlation between the branch and target addresses, which in turn allow for duplicated target address bits, in respect to branch address bits which can be designated for use as dynamic associative allocations within a specified array.

This may advantageously be accomplished through the use of an associative branch target buffer, and more particularly a dynamically associative branch target buffer, where the common portion of the address bits between the branch address and the target address are only stored once.

In designing a BTB, the amount of branches that can be stored in the BTB is part of the equation that determines how beneficial the BTB structure is. In general, a BTB is indexed by part of an instruction address within the processor, and tag bits are stored in the BTB such that the tag bits must match the remaining address bits of concern, that is, address bits, that were not used for the indexing. In order to improve the efficiency of the BTB, the BTB can be created such that it has an associativity greater than one. By creating an associativity greater than one, multiple branch/target pairs can be stored for a given index into the array. To determine which is the correct entry, if an entry at all, the tag bits are used to select one, at most, entries from the multiple entries stored for a given index.

In respect to the branch target, the branch target can be located close to the branch, possibly the branch itself, or somewhere far away from the address of the branch. The closer a branch is to its target, the more likely it is for a branch address tag and a target address to have equal address bits throughout some portion of the higher address bits. This is because programs, while being potentially very large in size, use a divide and conquer method in the way they are written. Different sections of code are used for different operations of a program. Within the smaller segments there are many relatively local branches and there exist few branches that go between the different segments of the program. Within the smaller segments, branch and target addresses are more likely to be close together and therefore have more bits in common than those branches which branch further distances. According to the invention described herein we exploit this locality of reference to engineer the associativity of a BTB such that associativity becomes dynamic in nature.

By creating a dynamic associative BTB, there can be a maximum of 'X' entries per line given that the branch to target mappings have many bits in common. When the bits are common in nature, they do not need to be stored for both the branch and the target, but rather only once for a branch/target combination. When there are additional distinct bits between a branch/target pair, then one of the dynamic entries that was to hold a branch/target pair, can now be used to create a larger single entry such that there can be additional distinct bits between that of a branch and a target. This reduces the associativity for a given line below 'X'; which leads to an overall win. By defining a mapping pattern of such nature, for a given number of bits for a BTB, then the total number of entries that can be stored in a table is greater in a dynamic BTB over that of the static BTB. Likewise, for a total number of required entries, the dynamic BTB will require less total table bits to implement over that of the static design. By using less bits, area is reduced which will either reduce the power required by the complete design, or allow for other performance features to now be added in the space that has been vacated.

The advantages provided by an associative branch target buffer with address compression are two fold. For the number of entries presented in non-compressed BTB structure of the prior art, the same number of entries can be achieved with a fraction of the array bits and equivalent branch hazard latency while achieving nearly the same accuracy. By reducing the number of array bits, the apparatus and method described herein reduces both the dynamic and especially static power that is required by such an array. The other advantage is that for the same amount of array bits, the number of BTB entries can be significantly increased.

When the BTB is fairly large in respect to the L1 cache, this forces the additional entries to be branch entries where the target misses the L1 cache. However, by making room for these branches in the BTB, the I-cache finite effect and consequent latency is reduced, improving overall performance.

A further aspect of our invention includes a method, system and computer program products for operating a processor having a pipeline, that is, a data pipeline, and a branch target buffer. The branch target buffer stores as static data at least one branch address, at least one associated target address, an append target address, and at least one dynamic entry, where the branch address and associated target address having a run of common bits. The dynamic entry is chosen from the group consisting of: (a). higher order target address bits; and (b) additional branch target buffer entries. The dynamic entry is a function of an append target address bit in the static sets. Specifically, the dynamic data may be the address of a previously taken branch and a short target address when the append target address bits are "0" and two or more target addresses when an append target address is "1".

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention is directed to a method and apparatus for predicting targets of branches wherein the number of branches may be greater than the number of entries than can be stored in a static branch target buffer (BTB) of the same size. The method and apparatus described herein provide an increased capability for storing and processing a large number of branches stored based on a set number of storage bits allocated for the table.

Figure 1:
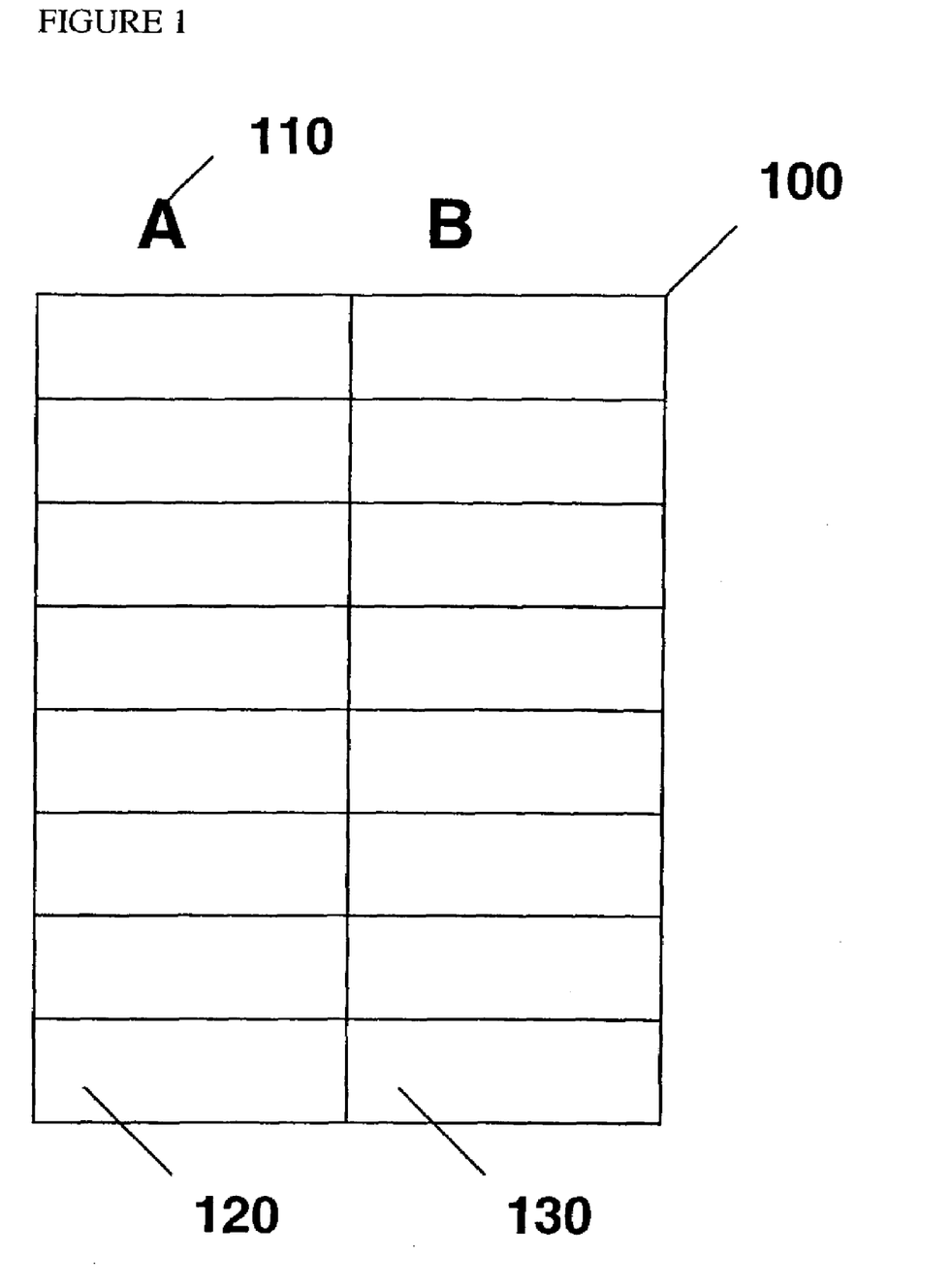
FIG. 1 illustrates one example of a typical BTB structure

A branch target buffer (BTB) 100, as shown in FIG. 1, is capable of predicting the branches in a series or body of code once the branches are stored in the BTB 100 if the number of branches in the code is less than or equal to the number of entries that can be stored in the BTB 100. The problem is that any large portion or body of commercial software code will never be able to allocate a unique entry in a BTB 100 for each and every branch in the code as there are just too many branches present to be stored all at one time in a BTB 100 structure.

Figure 2:
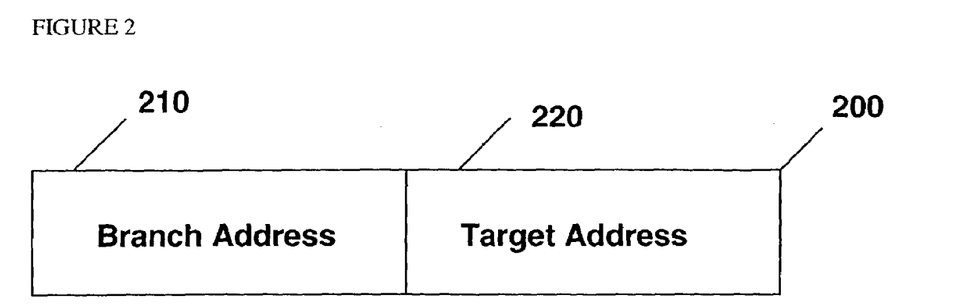
FIG. 2 illustrates one example of a BTB entry
Figure 3:
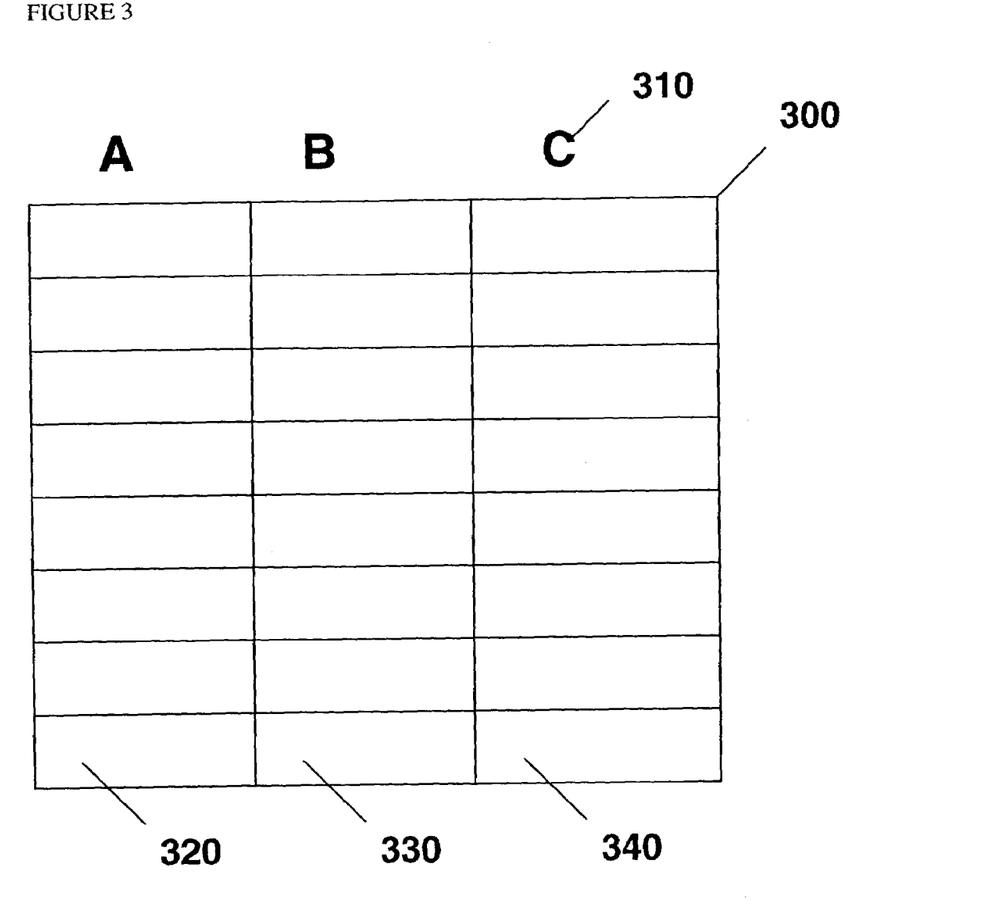
FIG. 3 illustrates one example of a dynamically adaptive BTB structure

As shown in FIGS. 1, 2 and 3, when storing an entry into a BTB 100, the branch address 120, 210 and target address 130, 220 of a particular branch are placed into the BTB 100. Because of size limitations, the size of the BTB 100 can hardly ever support the full memory addressing scheme of current machines. Therefore, the addressing to such a BTB 100 is based on using a portion of the instruction address of a given machine. Since only a portion of the address is used, aliasing can occur and if the table is left at one entry per index, then there can be many contentions for a given entry by multiple branches. To completely overcome these contentions a BTB 100 could be made fully associative where any branch could occupy any slot within the table. While this works in theory, this design paradigm is not rational to build once the number of entries exceeds some minute upper limit or threshold. This is because comparing all the entries to determine the entry that is desired when looking up into the table becomes impossible without throttling the reset of the machine; thereby making the performance of the machine worse than when the degree of associativity was one. A compromise is made where the associativity 110 of the BTB 100 can be in a desired range of 2 to X, where X is most likely to range up to 16 or some nearby factor.

Because the branch 210 and target addresses 220 bit, as shown in FIG. 2, are usually equivalent in some range, that is, they have a run of common bits, it becomes unnecessary to store unique bit values for the complete addresses, as in a static design 200, for portions of the branch and the target when one copy of the common bits (or the branch and an offset) will suffice. A modified, dynamic, BTB 300 structure, FIG. 3, can be created where the number of bits stored per branch/target entry 200 is less, but there are more entries 320, 330, 340 per line when the associativity 310 has been increased.

Each entry 200 in a static BTB contains: 1) the address of the previously taken branch (BA) 210, where BA consist of 'b' bits and 2) the address of the target address (TA) 220, where TA consist of 't' bits. Thus each branch entry 200 consist of (b+t) bits. For the description of a dynamic table, the ratios below will be applied for descriptive purposes; however, they can be altered to tune the performance of the array.

Figure 4:
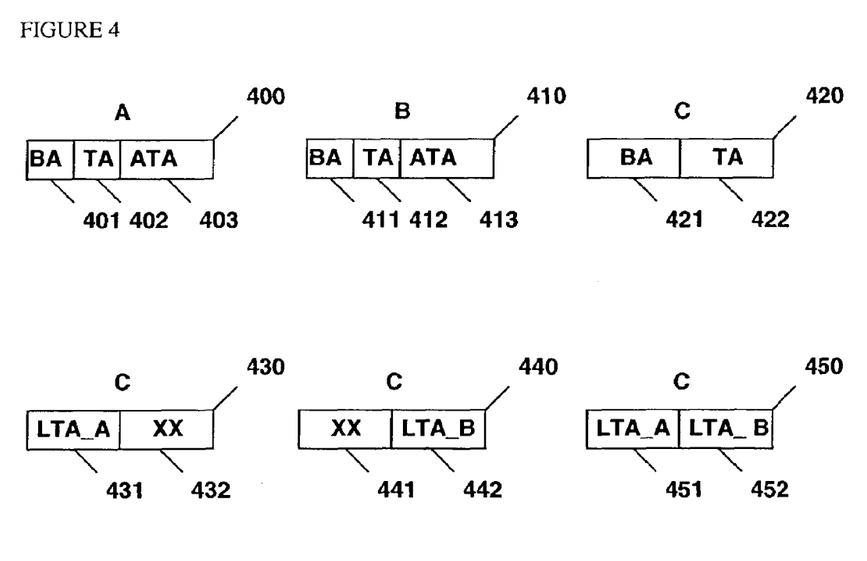
FIG. 4 illustrates one example of appending target address combinations

Define an integer 'k' such that $k=((2t-b)/3)$. The static sets, A 400 and B 410, in FIG. 4, are now changed such that they now contain: 1) The address of the taken branch (BA) 401, 411 at 'b' bits, 2) a short target address field (STA) 402, 412 at 'k' bits, and 3) a one bit field append target address (ATA) 403, 413. In addition to the two static sets, A 400 and B 410, one dynamic set, C, 420, 430, 440, 450 is now defined. The dynamic set is adaptive in that it can now be either used to store higher order target address bits 431, 442, 451, 452 or an additional BTB entry 421, 422 depending on the append target bit in the static sets. Dynamic set C 420 can hold high order target address 431, 451; 442, 452 (t−k) bits for static sets A 400 and B 410.

The function of dynamic set C 420, 430, 440, 450 is as defined. As set C is dynamic, it changes in definition depending on the append target address (ATA) bits of sets A 403 and B 413. Dynamic set C 420 contains the following fields when ATA bit of set A 403 and B 413 are zeros The address of previously taken branch (BA) 401, 411 at 'b' bits and 2) a short target address field (STA) 402, 412 at 'k' bits. When the ATA bit of set A 403 or B 413 is a 1, one, the definition changes to: 1) long target address (LTA) 431, 451 filed for set A at t−k bits and 2) long target address (LTA) 442, 452 filed for set B at t−k bits. In this example k is chosen such that $2(t-k)=(b+k)$; however, if the dynamic set was to cover 3 static sets in parallel then this equation would change to represent such.

Figure 5:
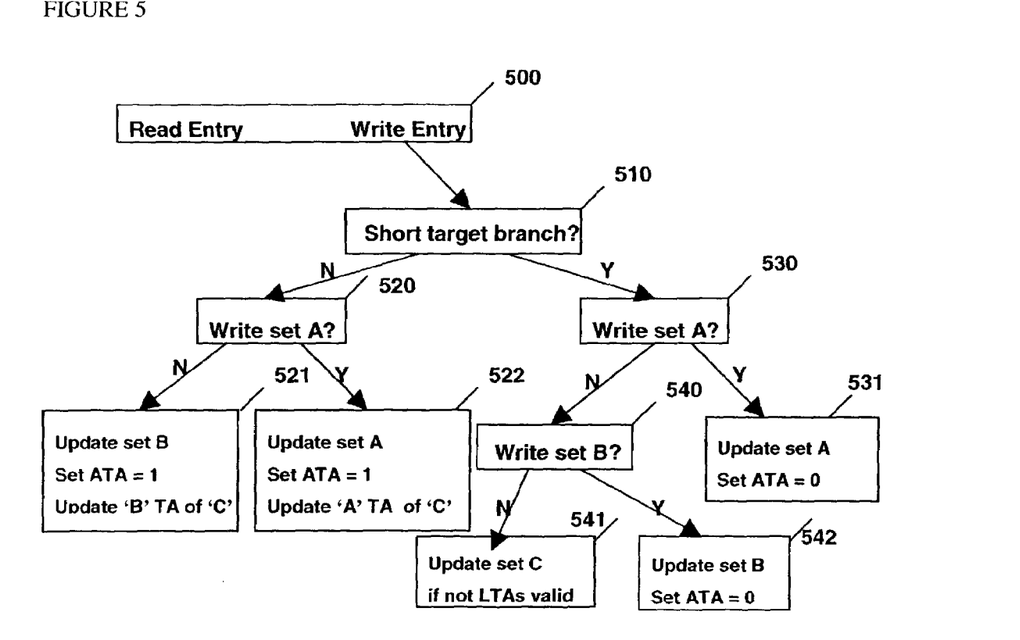
FIG. 5 illustrates one example of a write decision diagram

As shown in FIG. 5, whenever a branch is to be written 500 into the dynamic adaptive BTB (DABTB) 300 the following must first be taken into consideration: 1) the entry must be deemed as one of two types: 1) "Short target branch" (STB) 510 for which t−k significant bits of target address matches with the t−k significant of the branch address. 2) "Long target branch (LTB) 510 for which t−k significant bits of target address does not match the t−k significant bits of the branch address.

Long target branches 510 can only be installed in sets A 522 and B 521 and the procedure is as follows: 1) Pick the static set based on a replacement policy 520. Such a replacement policy may consist of replacing the entry that was least recently used. 2) Write BA, and the 'k' least significant bits of the target address in the static set and make the ATA bit a value of 1, one 522, 521. 3) Write the remaining (t−k) bits of target address in the respective dynamic set, i.e. C 522, 521.

Short target branches 510 can be written in any set, ABC 530, 540, as long as they are available. If dynamic set C 541 is functioning as a target extension, then it can not be used to store an entry. The steps are defined as: 1) Pick the static/dynamic set based on replacement policy 530, 540. Note that if C has its corresponding append "ta" bits asserted, then it can not be used for writing an additional entry. 2) Write BA, and the 'k' least significant bits of the target address 531, 542. 3) Reset ATA bit if the set is A 531 or B 542.

To rephrase the above, a given row in the BTB will be two way set associative if A 522 or B 521 is storing a long branch. The given row will be three way set associative when all static and dynamic entries are storing a short target branch.

Figure 6:
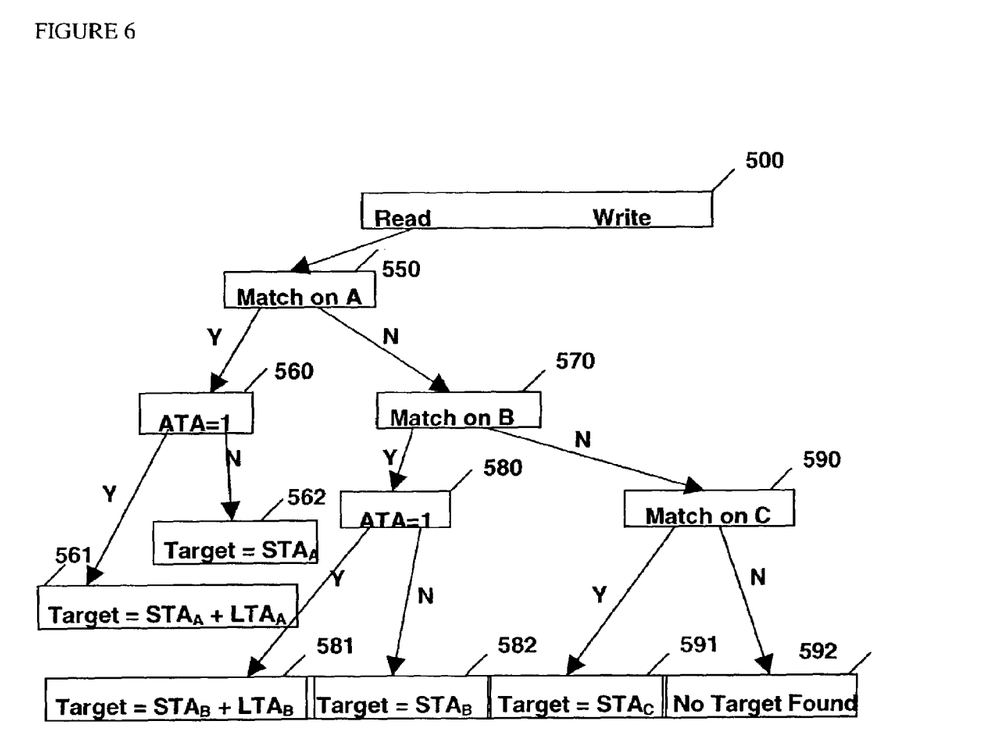
FIG. 6 illustrates one example of a read decision diagram

As shown in FIG. 6, for reading 500 an entry for the Dynamic Adaptive Branch Target Buffer (DABTB) it will either be a static or a dynamic set 560, 580. When reading a static set if the branch address (BA) matches 550, 570, 590, then the target address is given by, if ATA is 0, zero, TA=(t−k) significant bits of BA concatenated with 'k' bits of STA 562, 582. 3) If ATA is 1, one, then TA=(t−k) bits from the LTA field of the respective dynamic set, C, concatenated with 'k' bits of STA 561, 581. Dynamic set C is searched 590 for a match only if ATA bits of sets A and B are 0, zero. The target address in case of a BA match 591 is given by TA=(t−k) significant bits of BA concatenated with 'k' bits of STA. If a match is not determined, then there was not a target address located on the given search 592.

Figure 7:
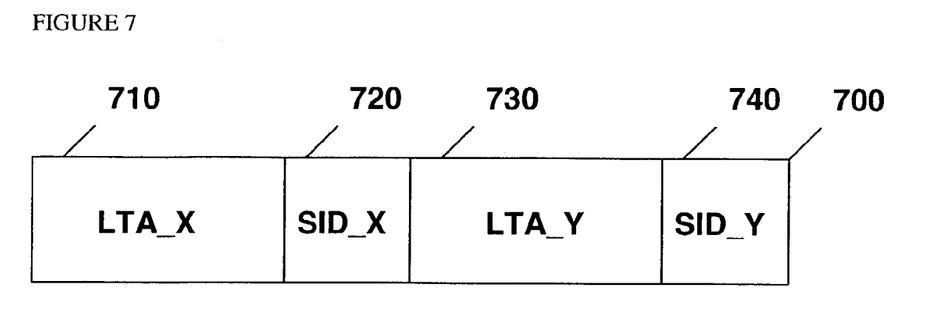
FIG. 7 illustrates one example of applying set IDs to a dynamic BTB entry

Furthermore, as shown in FIG. 7, by adding a static identification (SID) 720, 740 to a dynamic entry 700, then a given dynamic entry no longer must map to a single static entry. Such would be the case if the static associativity was modified from 2 to 3 in the above example thereby allowing the dynamic entry, the fourth way of associativity to support a maximum of two of the static entries; hence, supporting: zero static entries, A, B, C, AB, BC, or AC with long target address extensions 710, 730.

As the associativity of this structure is a function of values which will be stored, this structure is referred as S2D3, namely as a static 2 way and dynamic 3 way structure. In general, this concept can be applied to any SmDn (n>m) structure. This dynamic associativity is defined for each row at run time, as defined by the write algorithm, rather than defining it at design time as in the case of a regular, static, storage structure. Thus, with the addition of two Append Target Address (ATA) bits per row, potentially 50% more entries can be stored in the same structure as per this example. In general the number of total static and dynamic entries can be altered per design in addition to the number of dynamic entries that map to a static entry and the number of static entries that map to a given dynamic entry.

The capabilities of the present invention can be implemented in software, firmware, hardware or combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of operating a processor to effect storage of data, said processor having a pipeline and a branch target buffer, said method comprising:
   determining a run of common bits between at least one branch target address and an associated target address;
   storing, as static data, the at least one branch address and the associated target address as an entry in the branch target buffer;
   storing, as part of the static data, the run of common bits only once;
   storing, in the same entry, an append target address and at least one dynamic entry,
   wherein the number of bits stored for the branch target address and associated target address is based on the size of the run of common bits.

2. The method of claim 1 further comprising setting the number of dynamic entries per line.

3. The method of claim 1 further comprising setting the number of static entries per line.

4. The method of claim 1 wherein the branch target buffer lines further comprise a SetID.

5. The method of claim 4 wherein the SetID specifies the number of static entries supported by a dynamic entry.

6. The method of claim 1 comprising determining associativity per entry based upon separation between branch and target addresses.

7. The method of claim 1 comprising splitting a dynamic entry into regions, wherein each region supplies a target extension for a unique static entry.

8. The method of claim 7 wherein the dynamic entry is based on the append target address in the associated static entry.

9. The method of claim 7 comprising using a SetID to combine regions within a dynamic entry to support a target extension for an associated static entry.

10. The method of claim 1 comprising indexing the BTB based on a machine instruction address.

11. The method of claim 9 comprising indexing into a dynamically based associative array by one or more of control status of a machine and a direction history of instructions that attributed to a current address.

12. The method of claim 1 comprising storing a dynamic entry chosen from:
    a. higher order target address bits; and
    b. additional branch target buffer entries.

13. The method of claim 12 comprising storing the dynamic entry as a function of an append target address bit in the static sets.

14. The method of claim 13 comprising storing the address of a previously taken branch and a short target address when the append target address bits are "0".

15. The method of claim 13 comprising storing at least two target addresses when an append target address is "1".

16. A computer system having a data pipeline architecture, said computer comprising a branch target buffer, said branch target buffer adapted for
    determining a run of common bits between at least one braced target address and an associated target address;
    storing, as static data, the at least one branch target address as an entry in the branch target buffer;
    storing, as part of the static data, the run of common bits only once;
    storing, in the same entry, an append target address and at least one dynamic entry,
    wherein the number of bits stored for the branch target address and associated target address is based on the size of the run of common bits.

17. The computer system claim 16 further comprising code for setting the number of dynamic entries per line.

18. The computer system of claim 16 further comprising code for setting the number of static entries per line.

19. The computer system of claim 16 wherein the branch target buffer lines further comprise a SetID.

20. The computer system of claim 19 wherein the SetID specifies the number of static entries supported by a dynamic entry.

21. The computer system of claim 16 comprising code for determining associativity per entry based upon separation between branch and target addresses.

22. The computer system of claim 16 comprising code for splitting a dynamic entry into regions, wherein each region supplies a target extension for a unique static entry.

23. The computer system of claim 22 wherein the dynamic entry is based on the append target address in the associated static entry.

24. The computer system of claim 22 comprising code for using a SetID to combine regions within a dynamic entry to support a target extension for an associated static entry.

25. The computer system of claim 16 comprising code for indexing the Branch Transfer Buffer based on a machine instruction address.

26. The computer system of claim 24 comprising code for indexing into a dynamically based associative array by one or more of a control status of a machine and a direction history of instructions that attributed to a current address.

27. The computer system of claim 16 comprising code for storing a dynamic entry chosen from:
   a. higher order target address bits; and
   b. additional branch target buffer entries.

28. The computer system of claim 27 comprising code for storing the dynamic entry as a function of an append target address bit in the static sets.

29. The computer system of claim 28 comprising code for storing the address of a previously taken branch and a short target address when the append target address bits are "0".

30. The computer system of claim 28 comprising storing two target addresses when an append target address is "1".

31. The computer system of claim 16 wherein said branch target buffer is adapted to store a dynamic entry chosen from:
   a. higher order target address bits; and
   b. additional branch target buffer entries.

32. The computer system of claim 16 wherein said branch target buffer is adapted to store the dynamic entry as a function of an append target address bit in the static sets.

33. The computer system of claim 32 wherein said branch target buffer is adapted to store the address of a previously taken branch and a short target address when the append target address bits are "0".

34. The computer system of claim 32 wherein said branch target buffer is adapted to store at least two target addresses when an append target address is "1".

35. A program product comprising computer readable instructions on a storage medium, said instructions adapted to configure and control a computer having a data pipeline architecture to configure and control a branch target buffer, and execute the method of determining a run of common bits between at least one braced target address and an associated target address;
   storing, as static data, the at least one branch target address as an entry in the branch target buffer;
   storing, as part of the static data, the run of common bits only once;
   storing, in the same entry, an append target address and at least one dynamic entry,
   wherein the number of bits stored for the branch target address and associated target address is based on the size of the run of common bits.

36. The program product claim 35 further comprising program code for setting the number of dynamic entries per line.

37. The program product of claim 35 further comprising program code for setting the number of static entries per line.

38. The program product of claim 35 wherein the branch target buffer lines further comprise a SetID.

39. The program product of claim 38 comprising program code for causing the SetID to specify the number of static entries supported by a dynamic entry.

40. The program product of claim 35 comprising program code for determining associativity per entry based upon separation between branch and target addresses.

41. The program product of claim 35 comprising program code for splitting a dynamic entry into regions, wherein each region supplies a target extension for a unique static entry.

42. The program product of claim 41 wherein the dynamic entry is based on the append target address in the associated static entry.

43. The program product of claim 41 comprising program code for using a SetID to combine regions within a dynamic entry to support a target extension for an associated static entry.

44. The program product of claim 35 comprising program code for indexing the BTB based on a machine instruction address.

45. The program product of claim 43 comprising program code for indexing into a dynamically based associative array by one or more of the control status of the machine and the direction history of instructions that attributed to the current address.

46. The program product of claim 35 comprising storing a dynamic entry chosen from:
   a. higher order target address bits; and
   b. additional branch target buffer entries.

47. The program product of claim 46 comprising program code for storing the dynamic entry as a function of an append target address bit in the static sets.

48. The program product of claim 47 comprising program code for storing the address of a previously taken branch and a short target address when the append target address bits are "0".

49. The program product of claim 47 comprising program code storing two target addresses when an append target address is "1".

50. The program product of claim 35 wherein said program product further comprises program code for storing a dynamic entry chosen from:
   a. higher order target address bits; and
   b. additional branch target buffer entries.

51. The program product claim 50 wherein said program product further comprises code for storing the dynamic entry as a function of an append target address bit in the static sets.

52. The program product of claim 51 wherein said program product further comprises program code for storing the address of a previously taken branch and a short target address when the append target address bits are "0".

53. The program product of claim 51 wherein said program product further comprises program code for storing two target addresses when an append target address is "1".

* * * * *